United States Patent
Novak et al.

(10) Patent No.: US 9,405,912 B2
(45) Date of Patent: Aug. 2, 2016

(54) HARDWARE ROOTED ATTESTATION

(71) Applicant: Microsoft Corporation, Redmond, WA (US)

(72) Inventors: Mark Novak, New Castle, WA (US); Paul England, Bellevue, WA (US); Stefan Thom, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 253 days.

(21) Appl. No.: 14/080,284

(22) Filed: Nov. 14, 2013

(65) Prior Publication Data

US 2015/0134942 A1    May 14, 2015

(51) Int. Cl.
*G06F 9/24* (2006.01)
*G06F 15/177* (2006.01)
(Continued)

(52) U.S. Cl.
CPC .............. *G06F 21/575* (2013.01); *G06F 21/31* (2013.01); *G06F 21/72* (2013.01); *H04L 9/0822* (2013.01);
(Continued)

(58) Field of Classification Search
CPC ....... G06F 21/31; G06F 21/72; G06F 21/575; H04L 9/0822; H04L 9/16; H04L 9/3234; H04L 63/0876; H04L 2463/062
USPC ........................................ 713/1, 2, 100, 157
See application file for complete search history.

(56) References Cited

U.S. PATENT DOCUMENTS 6,996,710 B1    2/2006  Ellison et al.
7,313,679 B2   12/2007  Ranganathan
(Continued)

OTHER PUBLICATIONS

Huang, Xin, et al., "An Effective Approach for Remote Attestation in Trusted Computing," Proceedings of the 2009 International Symposium on Web Information Systems and Applications, May 22-24, 2009, pp. 80-83.
(Continued)

*Primary Examiner* — Michael J Brown
(74) *Attorney, Agent, or Firm* — Timothy Churna; Kate Drakos; Micky Minhas

(57) ABSTRACT

Computing devices that perform hardware rooted attestation are described, as are methods for use therewith, wherein such devices include a system integrated TPM (e.g., a firmware-based TPM), with m boot chain components loaded and executed prior to the system integrated TPM. Between powering-up of a device and the system integrated TPM being loaded and executed, seed morphing is performed for n=0 to m. This involves an $n^{th}$ encryption seed ($ES_n$) being morphed into an $n+1^{th}$ encryption seed ($ES_{n+1}$), under control of an $n^{th}$ boot chain component, by extending the $n^{th}$ encryption seed ($ES_n$) with a measurement of the $n+1^{th}$ boot chain component to thereby generate the $n+1^{th}$ encryption seed ($ES_{n+1}$). In a similar manner, an $n^{th}$ identity seed ($IS_n$) is morphed into an $n+1^{th}$ identity seed ($IS_{n+1}$). Such techniques establish trust in the system integrated TPM despite it not being the first component loaded and executed after powering-up.

20 Claims, 6 Drawing Sheets

(51) Int. Cl.
  G06F 21/57  (2013.01)
  G06F 21/31  (2013.01)
  G06F 21/72  (2013.01)
  H04L 29/06  (2006.01)
  H04L 9/08  (2006.01)
  H04L 9/32  (2006.01)
  H04L 9/16  (2006.01)

(52) U.S. Cl.
  CPC ............... *H04L 9/16* (2013.01); *H04L 9/3234* (2013.01); *H04L 63/0876* (2013.01); *H04L 2463/062* (2013.01)

(56) References Cited

U.S. PATENT DOCUMENTS

| | | | |
|---|---|---|---|
| 7,836,299 | B2 | 11/2010 | England et al. |
| 8,375,221 | B1 | 2/2013 | Thom et al. |
| 2009/0086979 | A1 | 4/2009 | Brutch et al. |
| 2011/0154501 | A1 | 6/2011 | Banginwar et al. |
| 2012/0110644 | A1 | 5/2012 | Thom et al. |
| 2012/0204020 | A1 | 8/2012 | Novak et al. |
| 2012/0266213 | A1 | 10/2012 | Spiers et al. |
| 2013/0212369 | A1* | 8/2013 | Imtiaz ............ G06F 21/575 713/2 |
| 2014/0032896 | A1* | 1/2014 | Chhabra ............ H04L 9/16 713/150 |
| 2014/0281455 | A1* | 9/2014 | Kochar ............ G06F 9/4401 713/2 |

OTHER PUBLICATIONS

Griffin, Dan, "How secure boot works," [http://www.jwsecure.com/2011/12/05/how-secure-boot-works/], retrieved on May 20, 2013, 2 pages.

Trusted Computing Group (TCG), "Trusted Platform Module Library", Family "2.0"—Level 00 Revision 00.93, Oct. 9, 2012.

* cited by examiner

US 9,405,912 B2

HARDWARE ROOTED ATTESTATION

BACKGROUND

As is well known to those skilled in the art, a conventional Trusted Platform Module (TPM) is a hardware device or "chip" that provides a secure crypto-processor. More specifically, a typical TPM chip generally offers facilities for the secure generation of cryptographic keys, and limitation of their use, in addition to a hardware pseudo-random number generator. It also includes capabilities such as "remote attestation" and sealed storage. Remote attestation is intended to create a practically un-forgeable summary of a particular software, firmware and/or hardware configuration. The extent of the summary is decided by the components involved in measuring the software, firmware and/or hardware configuration. This allows a third party to verify that the software, firmware and/or hardware configuration complies with some set policy. "Binding" certifies data using a TPM endorsement key, a unique key burned into the TPM chip during its production, or another trusted key descended from it. "Sealing" encrypts data similar to binding, but in addition specifies the state in which the TPM chip must be in order for the data to be decrypted or "unsealed."

TPM chips are also used to authenticate computing devices. Since each TPM chip has a unique and secret key burned in as it is produced, it is capable of performing platform authentication. For example, it can be used to verify that a system seeking access is an expected or authorized system. Clearly, pushing the security down to the hardware level of a system, by using discrete TPM chips in conjunction with corresponding security software, provides more protection than a software-only solution. However even when a TPM chip is used, keys are still vulnerable once exposed by the TPM chip to applications, as has been illustrated in the case of a conventional cold boot attack.

Many conventional solutions for implementing a TPM for a computing device involve integrating a discrete TPM chip into the motherboard or system board of such computing devices, which can also be referred to as computing systems. Unfortunately, such solutions face several challenges. For example, integrating TPM chips into a typical motherboard design results in an increased bill of materials (BOM) cost in the order of about $1 to $2 per system. However, even such relatively low per-device costs can add to a very large total considering the tremendous volume of computing devices being manufactured around the world. Another challenge often associated with conventional TPM chips is that discrete TPMs are generally not optimized for energy efficiency, and can impact the power budget for low-power systems (e.g., portable computing devices, PDA's, tablets, netbooks, mobile phones, etc.). Further, due to BOM constraints, discrete TPM chips are often implemented with relatively slow (and thus low cost) processors which negatively impacts or potentially prevents certain usage scenarios.

Consequently, because TPMs are generally considered to be optional system components, the additional monetary and power costs for including a discrete TPM chip in a system often leads to the exclusion of such devices during the manufacturing process. TPM chips are therefore not ubiquitous which makes it difficult for software or operating system developers to invest substantial resources in broad TPM usage scenarios. Another issue affecting broad TPM usage scenarios is that many conventional discrete TPM chips are not compatible with some form factors (e.g., phones, PDA's, tablets, etc.). In fact, many conventional devices such as mobile phones and tablet type computers don't generally use discrete TPM chips, and in some cases may not have the appropriate interconnects (e.g., an LPC bus) to support the use of discrete TPM chips with the system-on-a-chip (SoC) driving devices such as phones or tablets.

A discrete TPM chip, which can also be referred to as a hardware TPM or a TPM security device, also has the disadvantage that it could be desoldered from a computing device and fed arbitrary measurements, making it unsuitable as a means to withstand even an unsophisticated physical attack on the hardware. Another disadvantage of a discrete TPM chip is that if a new version of TPM functionality is required, an already manufactured and deployed discrete TPM chip cannot be upgraded to include the new TPM functionality. For example, if TPM 2.0 functionality is required, a discrete TPM chip that was not manufactured to include TPM 2.0 functionality cannot be used.

One alternative to a discrete TPM chip for use with a SoC, is to design the TPM functionality as part of the SoC. Such a TPM implementation would advantageously not be susceptible to desoldering attack. However, designing TPM functionality into a SoC would likely significantly increase the cost the SoC, e.g., due to the need to add an additional layer of silicon that would be necessary for the non-volatile storage required by the TPM as part of the SoC.

Another alternative to a discrete TPM chip is implementing TPM functionality in firmware. While this technique works very well, TPM functionality does not become available until relatively late in a boot cycle of a computing device, after some potentially vulnerably firmware components have already been executed.

SUMMARY

Computing devices that perform hardware rooted attestation are described herein, as are methods for use therewith, wherein such devices include a system integrated TPM (e.g., a firmware-based TPM), with m boot chain components loaded and executed prior to the system integrated TPM. Between powering-up of a device and the system integrated TPM being loaded and executed, seed morphing is performed for n=0 to m. This involves an $n^{th}$ encryption seed ($ES_n$) being morphed into an $n+1^{th}$ encryption seed ($ES_{n+1}$), under control of an $n^{th}$ boot chain component, by extending the $n^{th}$ encryption seed ($ES_n$) with a measurement of the $n+1^{th}$ boot chain component to thereby generate the $n+1^{th}$ encryption seed ($ES_{n+1}$). Similarly, an $n^{th}$ identity seed ($IS_n$) is morphed into an $n+1^{th}$ identity seed ($IS_{n+1}$), under control of the $n^{th}$ component in the boot chain, by extending the $n^{th}$ identity seed ($IS_n$) with a measurement of the $n+1^{th}$ component in the boot chain to thereby generate the $n+1^{th}$ identity seed ($IS_{n+1}$). In an embodiment, an initial encryption seed $ES_0$ and an initial identity seed $IS_0$ (which corresponds to n=0) are, respectively, a root encryption seed (RES) and root identity seed (RIS), each of which is unique to the computing device.

At least one of the RES and the RIS is immutably stored in hardware of the computing device. In an embodiment, both the RES and the RIS are immutably stored in hardware of the computing device. In an alternative embodiment, only one of the RES and the RIS is immutably stored in hardware of the computing device, and the other one is generated based on the one of the RES and the RIS that is immutably stored in hardware of the computing device.

In accordance with certain embodiments, after the RES is morphed into the encryption seed $ES_1$, any access to the RES is prevented until a next booting up and/or powering up of the computing device. Similarly, after the RIS is morphed into the identity seed $IS_1$, any access to the RIS is prevented until a next booting up and/or powering up of the computing device.

In certain embodiments, the system integrated TPM is a firmware-based trusted platform module (fTPM). In such an embodiment, when n=0, the $n^{th}$ component in the boot chain can be an initial program loader (IPL), and when n=m, the $n^{th}$ component in the boot chain can be the fTPM.

The techniques described can be used to establish trust in the system integrated TPM (e.g., fTPM) despite the system integrated. TPM not being the first component loaded and executed after powering-up of the computing device. In such methods, the encryption seeds ($ES_n$) are for use in generating encryption keys that are used to encrypt data in an isolated manner. The identity seeds ($IS_n$) are for use in generating identity keys that are used to establish globally unique and remotely verifiable security states for code segments stored in memory of the computing device.

In accordance with an embodiment, an endorsement primary seed (EPS) is generated in dependence on the $m^{th}$ encryption seed ($ES_{n=m}$), and a TPM endorsement key (EK) is generated in dependence on the EPS. In such an embodiment, the EPS, and the EK produced in dependence on the EPS, will both change when any of the components in the boot chain, up to and including the system integrated TPM, is changed.

In accordance with an alternative embodiment, a hardware attestation key is generated in dependence on the $m^{th}$ encryption seed ($ES_{n=m}$), and a TPM endorsement key (EK) is generated in dependence on an EPS. In such an embodiment, the EPS remains unchanged when a non-security related change is made to a component. In the boot chain, and thus, the EK produced in dependence on the EPS remains unchanged when a non-security related change is made to any of the components in the boot chain, up to and including the system integrated TPM.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Figure 1:
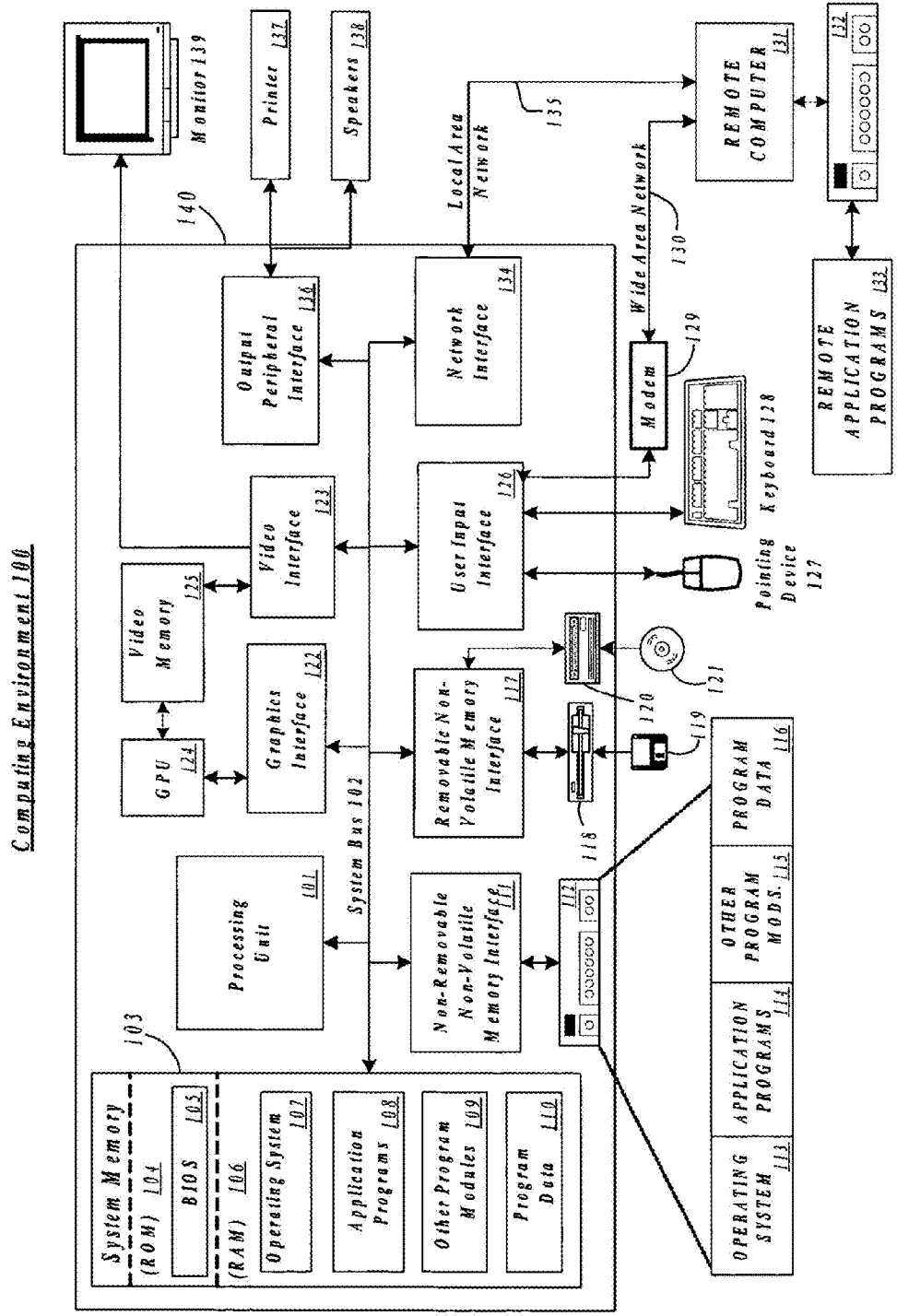
FIG. 1 sets forth an exemplary computing environment that is suitable to implement embodiments of the present technology.

Certain embodiments of the present technology disclosed herein are related to techniques for providing Trusted Platform Module (TPM) functionality without the need for a TPM chip, which as mentioned above, can be subject to desoldering attack, increase the cost of a computing device, and are not upgradeable. In other words, the embodiments described herein can be used to overcome many of the deficiencies of TPM chips. Additionally, while certain embodiments of the present technology disclosed herein may rely on firmware to provide TPM functionality, in which case TPM functionality does not become available until relatively late in the boot cycle of a computing device, such embodiments make firmware components that have already been executed (prior to the firmware-based TPM executing) less vulnerable to attack.

The mechanisms described herein are often described with reference to a Trusted Platform Module (TPM) because such a module is well known in the art and comprises attributes that can be utilized by the mechanisms described below. However, as will be recognized by those skilled in the art, TPMs traditionally must conform to the Trusted Computing Group's (TCG's) standards and requirements for such a module and, as such, comprise features and functionality that are useless, or, at best, orthogonal to the mechanisms described herein. Thus, while reference is made to TPMs for purposes of descriptional the mechanisms described herein are equally applicable to any "trusted execution environment" that can securely provide the requisite functionality, such as a secure monotonic counter, one or more platform configuration registers that can only be modified in defined ways according to the components being instantiated by a computing device, and the ability to sign or quote information with reference to one or more securely maintained and obtained cryptographic keys. As utilized herein, the term "trusted execution environment" is meant to encompass a TPM conforming to the TCG standards, as well as other hardware or software modules that can securely provide the requisite functionality, such as that enumerated above and described in more detail below.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured fifth. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

Exemplary Computing and Networked Environments

Prior to explaining details of the present technology, FIG. 1 is used to describe an exemplary computing system environment 100 in which embodiments of the present technology can be implemented. The computing system environment 100 in FIG. 1, which can also be referred to as a computing device, is only one example of a suitable computing environment and is not intended to suggest any limitation as to the scope of use or functionality of embodiments of the present technology. Neither should the computing environment 100 be interpreted as having any dependency or requirement relating to any one or combination of components illustrated in the exemplary operating environment 100.

The present technology is operational with numerous other general purpose or special purpose computing system environments or configurations. Examples of well-known computing systems, environments, and/or configurations that may be suitable for use with embodiments of the present technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the present technology may be implemented in the general context of computer-executable instructions, such as program modules, being executed by a computer. Generally, program modules include routines, programs, objects, components, data structures, etc. that perform particular tasks or implement particular abstract data types. The present technology may also be practiced in distributed computing environments where tasks are performed by remote processing devices that are linked through a communications network. In a distributed computing environment, program modules may be located in both local and remote computer storage media including memory storage devices.

FIG. 1 illustrates an exemplary system for implementing the embodiments of the present technology, including a general purpose computing device in the form of a computer 121. Components of computer 121 may include, but are not limited to, a processing unit 101, a system memory 103, and a system bus 102 that couples various system components including the system memory to the processing unit 101. The system bus 102 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A TPM is not shown in FIG. 1, though a TPM may be a part of computers that implement the present technology. As explained above, a TPM may be a hardware chip that is welded to the motherboard or integrated into a chipset or other hardware component of a computer such as that of FIG. 1 for the purpose of providing a range of security functions including the TPM functions described herein. However, for the purpose of this specification, it assumed that the TPM is a non-hardware TPM. For example, the TPM can be a firmware-based TPM (fTPM), exemplary details of which are described in U.S. Pat. No. 8,375,221, which is assigned to Microsoft Corporation, Redmond, Wash., and which is incorporated herein by reference in its entirety. An fTPM is just one example of a system integrated TPM, which can be used in place of a hardware TPM. A system integrated TPM, instead of being firmware based, can be virtual, logical, or network attached. It is also possible that a system integrated TPM be something that is physical and derives boot information through a back channel. For the remainder of this description, unless stated otherwise, it will be assumed that the system integrated TPM is a firmware-based trusted platform module (fTPM), and thus, the TPM will be typically be referred to hereafter at the fTPM. The fTPM, or more generally system integrated TPM, can perform comparisons and verifications of measurements submitted to it, release keys for access to encrypted memory resources, and provide a range of other functions, as described in the TPM 2.x Architectural Specification.

Computer 140 typically includes a variety of computer readable media, which may include any available media that can be accessed by computer 140 and includes volatile and nonvolatile media as well as removable and non-removable media. By way of example, and not limitation, computer readable media may comprise computer storage media and communication media. Computer storage media may be implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 140. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media in accordance with the present technology.

The system memory 103 includes computer storage media in the form of volatile and/or nonvolatile memory such as read only memory (ROM) 104 and random access memory (RAM) 106. A basic input/output system 105 (BIOS), containing the basic routines that help to transfer information between elements within computer 121, such as during start-up, is typically stored in ROM 104. For a more specific example, the first component in a boot chain, typically referred to as the initial program loader (IPL), can be part of the BIOS 105 that is stored in the ROM 104.

RAM 106 typically contains data and/or program modules that are immediately accessible to and/or presently being operated on by processing unit 101. By way of example, and not limitation, FIG. 1 illustrates operating system 107, application programs 108, other program modules 109, and program data 110.

The computer 121 may also include other removable/non-removable, volatile/nonvolatile computer storage media. By way of example only, FIG. 1 illustrates a hard disk drive 112 that reads from or writes to non-removable, nonvolatile magnetic media, a magnetic disk drive 118 that reads from or writes to a removable, nonvolatile magnetic disk 119, and an optical disk drive 120 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 112 is typically connected to the system bus 102 through a non-removable memory interface such as interface 111, and magnetic disk drive 118 and optical disk drive 120 are typically connected to the system bus 102 by a removable memory interface, such as interface 117. In accordance with certain embodiments, an fTPM can be stored in EPROM of the computer 121 or some other reprogrammable memory, as can components in a boot chain other than the IPL. The IPL, by contrast, is preferably stored in the ROM 104, e.g., as part of the BIOS 105.

The drives and their associated computer storage media discussed above and illustrated in FIG. 1, provide storage of computer readable instructions, data structures, program modules and other data for the computer 121. In FIG. 1, for example, hard disk drive 112 is illustrated as storing operating system 113, application programs 114, other program modules 115, and program data 116. Note that these components can either be the same as or different from operating system 107, application programs 108, other program modules 109, and program data 110. Operating system 113, application programs 114, other program modules 115, and program data 116 are given different numbers here to illustrate that, at a minimum, they are different copies. A user may enter commands and information into the computer 121 through input devices such as a keyboard 128 and pointing device 127, commonly referred to as a mouse, trackball or touch pad. Other input devices (not shown) may include a microphone, joystick, game pad, satellite dish, scanner, or the like. These and other input devices are often connected to the processing unit 101 through a user input interface 126 that is coupled to the system bus, but may be connected by other interface and bus structures, such as a parallel port, game port or a universal serial bus (USB). A monitor 139 or other type of display device is also connected to the system bus 102 via an interface, such as a video interface 123. In addition to the monitor, computers may also include other peripheral output devices such as speakers 138 and printer 137, which may be connected through an output peripheral interface 136.

The computer 121 may operate in a networked environment using logical connections to one or more remote computers, such as a remote computer 131. The remote computer 131 may be a personal computer, a server, a router, a network PC, a peer device or other common network node, and typically includes many or all of the elements described above relative to the computer 121, although only a memory storage device 132 has been illustrated in FIG. 1. The logical connections depicted in FIG. 1 include a local area network (LAN) 135 and a wide area network (WAN) 130, but may also include other networks. Such networking environments are commonplace in offices, enterprise-wide computer networks, intranets and the Internet.

When used in a LAN networking environment, the computer 121 is connected to the LAN 135 through a network interface or adapter 134. When used in a WAN networking environment, the computer 121 typically includes a modem 129 or other means for establishing communications over the WAN 130, such as the Internet. The modem 129, which may be internal or external, may be connected to the system bus 102 via the user input interface 126, or other appropriate mechanism. In a networked environment, program modules depicted relative to the computer 121, or portions thereof, may be stored in the remote memory storage device. By way of example, and not limitation, FIG. 1 illustrates remote application programs 133 as residing on memory device 132.

It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the present technology, or certain aspects or portions thereof, may take the form of program code (i.e., instructions) embodied in tangible media, such as a machine-readable storage medium wherein, when the program code is loaded into and executed by a machine, such as a computer, the machine becomes an apparatus for practicing the present technology. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the present technology, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present technology in the context of one or more stand-alone computer systems, the present technology is not so limited, but rather may be implemented in connection with any computing environment, such as a network or distributed computing environment. Still further, the present technology may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

Figure 2:
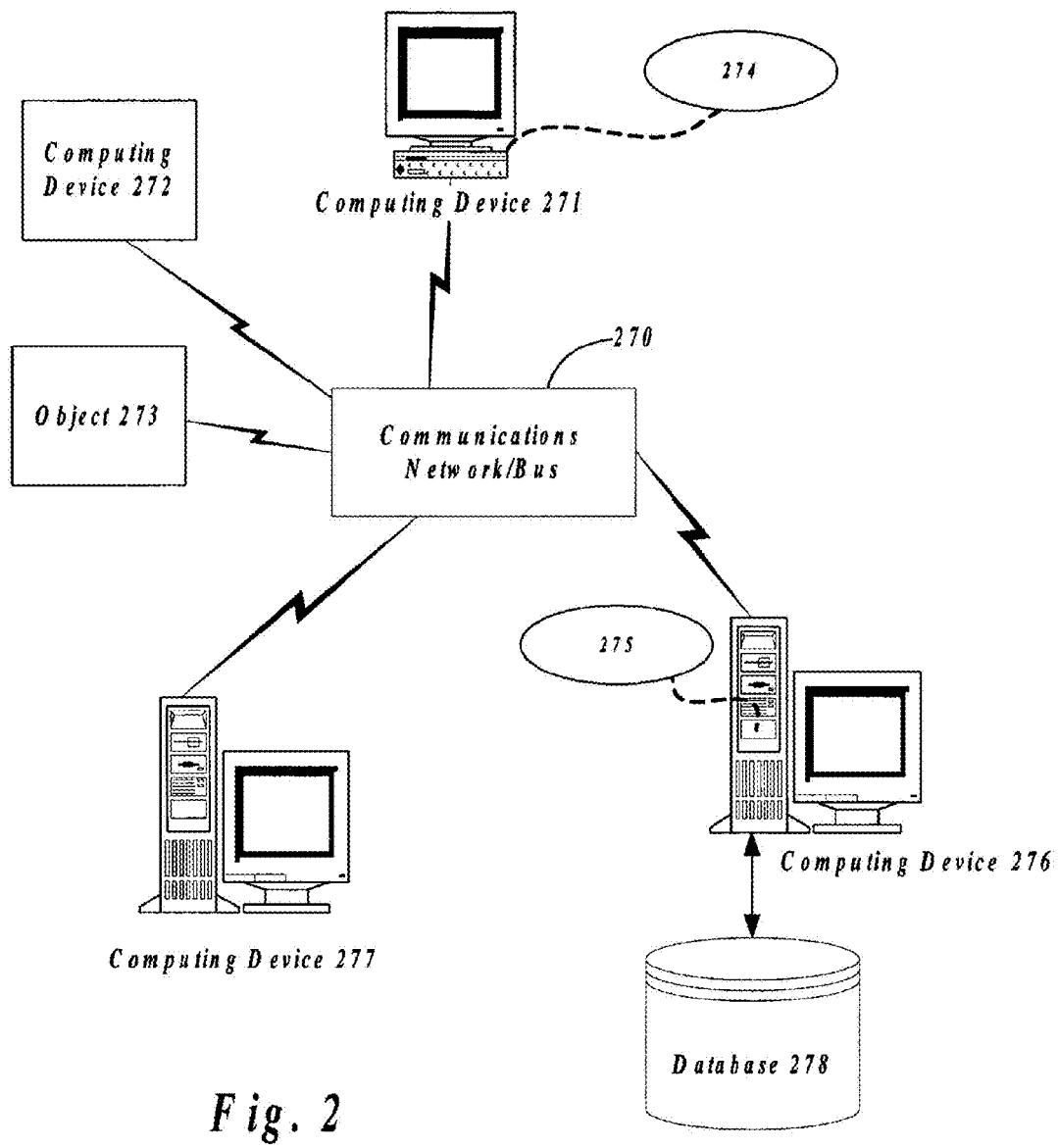
FIG. 2 provides an extension of the basic computing environment from FIG. 1 to emphasize that modem computing techniques can be performed across multiple networked devices.

An exemplary embodiment of a networked computing environment is illustrated in FIG. 2. One of ordinary skill in the art will appreciate that networks may connect any computer or other client or server device in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the present technology, each entity 271, 272, 273, 274, 275, 276, 277 and 278 may contain discrete functional program modules that might make use of an application programming interface (API), or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework of FIG. 1, and the further diversification that can occur in computing in a network environment such as that of FIG. 2, the systems and methods provided herein cannot be construed as limited in any way to a particular computing architecture. Instead, the present technology should not be limited to any single embodiment, but rather should be construed in breadth and scope in accordance with the appended claims.

Definitions and Notations

The description herein differentiates between keys and seeds. Both are presumed to be secret values, with keys derived limn seeds. Derived keys may or may not be secret, depending on circumstances. A distinction is that seeds are not used directly in any cryptographic operation, other than key derivation and morphing into other seeds:

OWF($i_1, i_2, \ldots, i_n$) will denote some (unspecified) cryptographically secure one-way hash function over a concatenation of its inputs. Such a one-way function can be used to morph a seed into another seed, as described in more detail below.

KDF-s($i_1, i_2, \ldots, i_n$) will denote some unspecified cryptographically secure key derivation function producing a symmetric key. Similarly, KDF-a($i_1, i_2, \ldots, i_n$) will produce an asymmetric key pair from its inputs, one of which is typically a seed value.

The different references to OWE and KDF need not always refer to the same algorithms; the instances when they do will be self-evident from context.

The following illustrates the mechanism used in seed morphing and key derivation:

$$\text{seed}_n\{<\text{OWF}>\text{seed}_{n+1} \{<\text{OWF}>\text{seed}_{n+2}, \ldots\}\}<\text{KDF}>\text{key}.$$

A boot chain, as the term is used herein, is the ordered sequence of discrete components executed by a computing device at boot time, which may occur upon power-up of a computing device, or upon a reboot of the computing device. Individual components in this ordered set can be denoted by $BC_0, BC_1, \ldots, BC_i, \ldots$ In other words, $BC_0, BC_1 \ldots BC_i$ are components of the boot chain.

In accordance with a preferred embodiment, the first component in the boot chain is immutable (e.g., stored in on-die ROM) for the lifetime of the device. The rest of the components in the boot chain may be in-field serviceable through some update process. In accordance with certain embodiments, the first component in the boot chain, i.e., $BC_0$, is an initial program loader (IPL) stored in ROM.

Each component in the boot chain has a public, globally unique identity: $ID(BC_i)$. This identity does not change when the component is serviced (replaced with a newer version). In addition, each component has a Regular Version Number (RVN) and a Security Version Number (SVN). RVN increases monotonically between releases, whereas SVN is monotonically non-decreasing: it is only bumped when the change involves fixing some security vulnerability.

All seeds, keys and identity values are qualified with the following designations:

"P"—value is public; it is assumed to be well known and easily accessible to anyone.

"D"—value is available directly to the component in question; by implication it is not available to any other component unless the component in question leaks it.

"U"—value is available for use by the component in question; it is not disclosed to the component.

"R"—value is restricted; it is not available directly to any firmware or software component.

To illustrate the use of these designations, the notation U-BC$_0$ is a value that is available for use by the initial component of the boot chain (BC$_0$).

Root Seeds and the Device ID

In accordance with an embodiment, a computing device includes a hardware protected, globally unique "root encryption seed" RES (R) that is strongly safeguarded against disclosure to any entity, including the device manufacturer. A hardware protected seed (or more generally, value), as the term is used herein, means that after being initially read and morphed into another value, that value is no longer accessible to any other component until a next boot. A purpose of the RES is to ensure that even the computing device manufacturer cannot decrypt data stored locally by the computing device.

In accordance with an embodiment, a computing device also includes a hardware protected, globally unique "root identity seed" RIS (R) that is safeguarded against disclosure such that it is accessible to only two entities—the early boot logic of the computing device and the computing device manufacturer. In an embodiment, the RIS is derived from the RES as follows:

RIS:=OWF(RES, "Identity").

In accordance with an embodiment, the RES is stored in an immutable hardware component, such as, but not limited to, one-time-programmable (OTP) fuses of the computing device; and the RIS is generated based on the RES using, e.g., a one-way-hash function. It is also possible that both the RES and the RIS are stored in immutable hardware. Alternatively, although potentially less preferable than storing the RES in immutable hardware, the RIS can be stored in an immutable hardware component, and the RES can be generated based on the RIS.

In an alternative embodiment, for use with a computing device that is equipped with a hardware based cryptographic engine capable of using a fenced-off secret key HW-Key (R), an encrypted value of RIS, Encrypted-RIS, could be stored in one-time-programmable (OTP) fuses; in that case the value of RIS could be computed at runtime as:

RIS:=Decrypt$_{HW-Key}$(Encrypted-RIS).

In an embodiment, a computing device also includes a public, globally unique Device-ID (P). The Device-ID can be independent of RIS, in which case the computing device stores the Device-Id in addition to RIS. If space is constrained, it is also possible to derive the Device-ID from RIS as follows:

Device-Id:=OWF(RIS, "Device-Id").

In order to store data in a computing device's Replay Protected Media Block (RPMB) storage, which is a storage medium shared between multiple components and requiring its own confidentiality and integrity protections, the computing device can derive one other seed value—the RPMB Seed (U-BC$_0$) as follows:

RPMBS:=OWF(RES, "RPMB").

In such an embodiment, the RPMB seed is used, by one of the early boot components, to derive the RPMB key(s) and initialize the RPMB subsystem. It is noted that the RPMB key is not an encryption key, but rather, is used only for integrity and rollback protection. In particular, the key is not required to read data from storage, only to validate integrity of the data.

The RES can be, e.g., a 256-bit globally unique value that should not at any time be available to any firmware or software component of the device, and should not at any point be made available to the device manufacturer. More generally, this value should not be disclosed to any component or entity, except the cryptographic engine for purposes of morphing it into other seeds. Preferably the RES value is burned into fuses. Preferably, the RES should be generated using an on-board random number generator (RGN) of the computing device. Alternatively, the RES can be generated externally and burned into fuses, so long as the externally generated value is securely discarded. Additionally, the RES value should be stored in the computing device in a manner that resists disclosure even in the face of a sophisticated physical attack.

The RIS can similarly be, e.g., a globally unique 256-bit value. Like the RES value, the RIS value should not at any time be available to any firmware or software component of the device. The RIS value may be stored in the computing device, encrypted with a fenced-off secret key HW-Key or it may be derived at boot time from the RES value through the aforementioned seed morphing mechanism. After a computing device is assembled including a component (e.g., a system on chip, SoC) containing the RES (and possibly the RIS), the computing device can undergo a provisioning process that includes installation of device family specific firmware and software components. If one of the components installed is an fTPM trustlet (which can also be referred to as the fTPM component, or simply the fTPM), the device may leave the factory floor with one or more endorsement certificates corresponding to the versions of the boot chain components up to and including the fTPM trustlet.

Per-Component Encryption and Identity Seeds

In accordance with an embodiment, each component in a boot chain gets access to its own set of encryption seeds (ESs) and an identity (IS) seed. The first component in the boot chain, BC$_0$, which can also be referred to as the Initial Program Loader (IPL), and which can be baked into on-die ROM, uses the RES and the RIS for its ES and IS, respectively, as follows:

ES(BC$_0$):=RES

IS(BC$_0$):=RIS

As explained in additional detail below, as additional components in the boot chain get loaded, these seeds are morphed, providing these components with their own identities and storage secrecy. In accordance with an embodiment, as seeds morph, old versions of the seeds are erased from memory, which provides desirable security hygiene.

Boot Chain and Secret Seed Morphing

In accordance with an embodiment, each component in the boot chain validates the integrity of the next component the component that is about to load. For example, an initial program loader (IPL) validates the integrity of a secondary program loader (SPL), where the IPL is the initial component in a boot chain, and the SPL is the next component in the boot chain. This can be done by ensuring that the next component is cryptographically signed by an authority that the current component trusts (e.g., by validating a signature using a signing key) or that it is simply "white listed" (e.g., by comparing the digest of the component's binary image against a list of well-known hashes).

In accordance with an embodiment, for each component in the boot chain that gets loaded, the previous component in the boot chain computes a set of encryption seeds (one for each version up to the current security version number) and a single identity seed. For each component in the boot chain, the component can decrypt data that previous versions of the component have stored, but the component cannot decrypt data that a future version of the component would have stored.

In accordance with an embodiment, encryption seeds (ES, U-$BC_{n-1}$) can thus be derived as follows:

$$ES(BC_{n+1}, j):=OWF(ES(BC_n, 1, 1), ID(BC_{n+1}), j) \forall j$$
$$\epsilon\{1 \ldots SVN(BC_{n+1})\}.$$

This scheme delivers forward secrecy if the key derivation algorithm honors the value of $SVN(BC_{n+1})$ and does not permit a caller to compute the value for any input 'j' that exceeds that value.

Figure 3A:
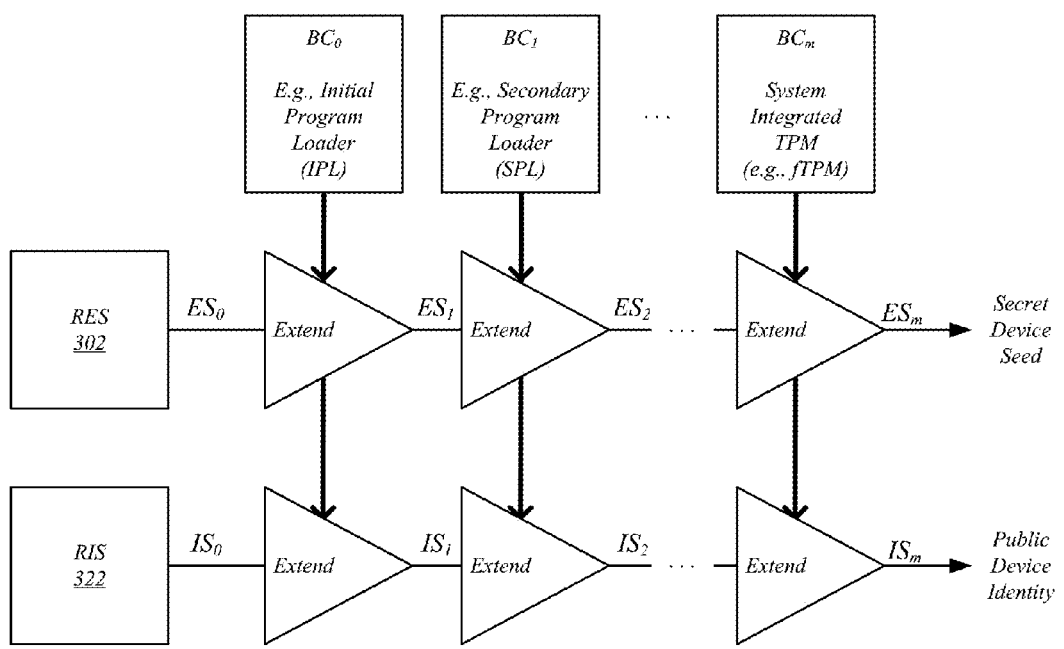
FIGS. 3A and 3B illustrate seed morphing techniques according to some embodiments of the present technology.

FIG. 3A will be used to illustrate the above mentioned seed morphing in additional detail. Advantageously, the use of such seed morphing establishes trust in the fTPM (or other system integrated TPM) despite the fTPM (or other system integrated TPM) not being the first component loaded and executed after powering-up of the computing device. Referring to FIG. 3A, an RES is stored in an immutable hardware component 302, such as, an immutable fuse bank or some other on-die read only memory (ROM) of a computing device into which a value can be baked-in. Also show is an RIS, which is similarly stored in an immutable hardware component 322. Components in the boot chain are labeled $BC_0$, $BC_1$ ... $BC_m$. In accordance with an embodiment, $BC_0$ is an initial program loader (IPL), $BC_1$ is a secondary program loader (SBL) ... and $BC_m$ is an fTPM.

Referring to FIG. 3A, the encryption seed $ES_0$, which is the RES, is morphed into an encryption seed $ES_1$, under control of the boot component $BC_0$, which is the IPL, by extending the encryption seed $ES_0$ with a measurement of the next component in the boot chain, $BC_1$. While the boot component $BC_1$ can be a SBL that need not be the case. The encryption seed $ES_1$ is morphed into an encryption seed $ES_2$, under control of the boot component $BC_1$, by extending the encryption seed $ES_1$ with a measurement of the next component in the boot chain, i.e., $BC_2$. This process is repeated until the encryption seed $ES_{m-1}$ is morphed into an encryption seed $ES_m$, under control of the boot component $BC_{m-1}$, by extending the encryption seed $ES_{m-1}$ with a measurement of the boot chain component $BC_m$, wherein the boot chain component $BC_m$ is the fTPM (or some other system integrated TPM). In summary, after powering-up of the computing device, but before the system integrated TPM is loaded and executed by the computing device, for n=0 to m, wherein n is an integer incremented by 1, an $n^{th}$ encryption seed ($ES_n$) is morphed into an n+$1^{th}$ encryption seed ($ES_{n+1}$), under control of an $n^{th}$ component in the boot chain ($BC_n$), by extending the $n^{th}$ encryption seed ($ES_n$) with a measurement of the n+$1^{th}$ component in the boot chain ($BC_{n+1}$) to thereby generate the n+$1^{th}$ encryption seed ($ES_{n+1}$). The resulting encryption seed $ES_m$, which can also be referred to as the secret device seed, can then be used to generate an endorsement primary seed (EPS) or a hardware attestation key, as described in additional detail below with reference to FIGS. 4 and 5. More generally, the encryption seeds ($ES_n$) are for use in generating encryption keys that are used to encrypt data in an isolated manner.

Still referring to FIG. 3A, the identity seed $IS_0$, which is the RIS, is morphed into an identity seed $IS_1$, under control of the boot component $BC_0$, which is the IPL, by extending the identity seed $IS_0$ with a measurement of the next component in the boot chain, i.e., $BC_1$. Such extending can be performed using a OWF. The identity seed $IS_1$ is morphed into an identity seed $IS_2$, under control of the boot component $BC_1$, by extending the identity seed $IS_1$ with a measurement of the next component in the boot chain, i.e., $BC_2$. This process is repeated until the identity seed $IS_{m-1}$ is morphed into an identity seed $IS_m$, under control of the boot component $BC_{m-1}$, by extending the identity seed $IS_{m-1}$ with a measurement of the boot chain component $BC_m$, wherein the boot chain component $BC_m$ is the fTPM (or some other system integrated TPM). In summary, after powering-up of the computing device, but before the system integrated TPM is loaded and executed by the computing device, for n=0 to m, wherein n is an integer incremented by 1, an $n^{th}$ identity seed ($IS_n$) is morphed into an n+$1^{th}$ identity seed ($IS_{n+1}$), under control of an $n^{th}$ component in the boot chain ($BC_n$), by extending the $n^{th}$ identity seed ($IS_n$) with a measurement of the n+$1^{th}$ component in the boot chain ($BC_{n+1}$) to thereby generate the n+$1^{th}$ identity seed ($IS_{n+1}$). The resulting identity seed $IS_m$ can also be referred to as the public device identity. The identity seeds ($IS_n$), up to and including $IS_m$, can be used to generate identity keys that are used to establish globally unique and remotely verifiable security states for code segments stored in memory of the computing device.

Figure 3B:
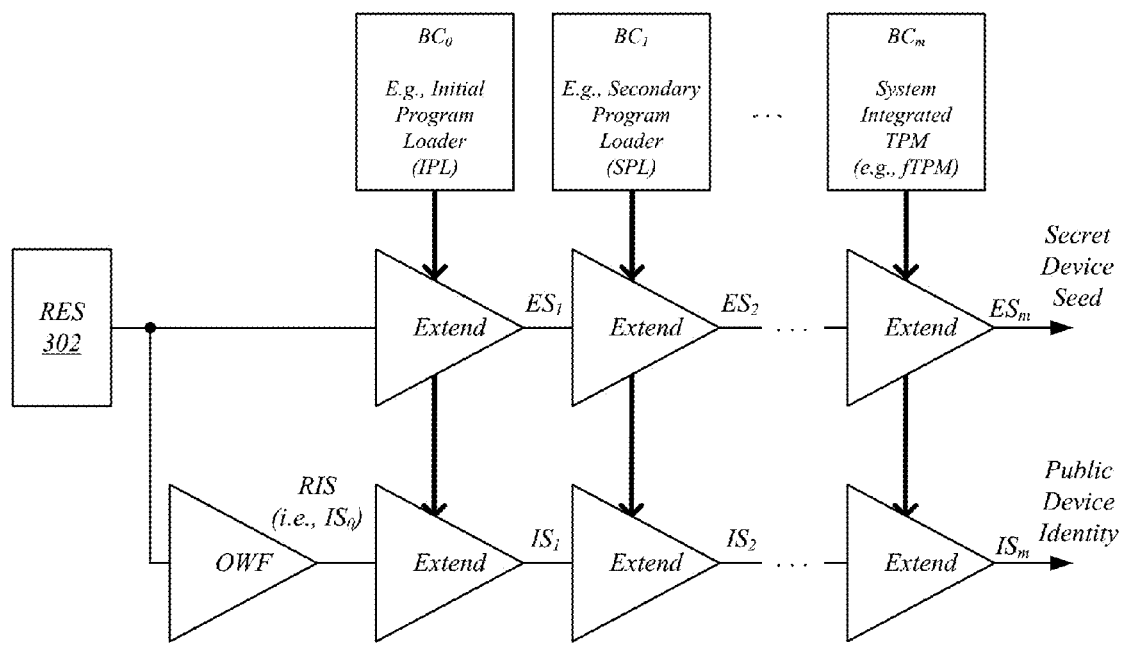

FIG. 3B, illustrates the alternative embodiment where the RES is stored in an immutable hardware component 302, and the RIS is generated based on the RES using a OWF, such as a cryptographic hash function. As was mentioned above, alternatively the RIS can be stored in an immutable hardware component, and the RES can be generated based on the RIS.

After the RES is morphed into the encryption seed $ES_1$, any access to the RES is prevented until a next booting up and/or powering up of the computing device. Similarly, after the RIS is morphed into the identity seed $IS_1$, any access to the RIS is prevented until a next booting up and/or powering up of the computing device.

In an embodiment, the identity seeds (ISs) change every time a component of the boot chain is serviced (i.e., changed). In an alternative embodiment, the identity seeds (ISs) only change when a security version number (SVN) of a component in the boot chain changes. In other words, in the alternative embodiment, identity seeds (ISs) are not affected by a non-security related change to a component in the boot chain. The encryption seed derivation mechanism will depend on which embodiment is implemented. For the SVN variant (where only an SVN change triggers an identity seed change): changing a component for a non-security reason preserves the component's identity seed; bumping the security version number of any component in the boot chain, up to and including the component itself, gives the component a new identity, and deprives it of all past identities; and an attacker that "owns" a component n in the boot chain cannot successfully precompute the IS value(s) for the subsequent component(s), which is the forward secrecy requirement.

The last feature mentioned above will be discussed first. Seed morphing is a deterministic operation with deterministic results. Forward secrecy requires that future values cannot be guessed by an attacker post-eviction. In an embodiment, to provide such forward secrecy, a random, unpredictable input into the derivation process, illustrated in the formulas below as the optional nonce, is used. The value of the nonce can be persisted with the seeds or keys derived with the help of the nonce, but cannot be guessed by an attacker beforehand.

Identity seeds (IS, U-$BC_{n+1}$) under this SVN-sensitive scheme can be derived as follows:

$$IS(BC_{n+1}):=OWF(IS(BC_n), ID(BC_{n+1}), SVN(BC_{n+1}),$$
$$[Nonce]).$$

An image identity (ID) is used, since SVNs are monotonically increasing, and thus, predictable. Identity input into the derivation scheme ensures that two different sub-components with the same SVN get different identities. If Nonce is used, the image ID need not be used.

For the embodiment where application identity changes on every code change anywhere earlier in the boot chain, the identity seeds can be derived as follows:

$$IS(BC_{n+1}):=OWF(IS(BC_n), IH(BC_{n+1}), [Nonce])$$

where IH is the "image hash" (e.g., a digest of the binary). Note that the image identity (ID) of the component is no longer needed in the derivation since IH is sufficient by itself.

In all of the above, $IS(BC_0) \equiv RIS$, $ES(BC_0) \equiv ES(BC_0, 1) \equiv RES$ (the latter holds since $BC_0$ is presumed immutable), wherein the notation "≡" indicates equal by definition.

Not all components require their own storage. Components that do not require storage may get only a single encryption seed—with the SVN value of "1". This is done so that encryption seed morphing gets to continue throughout the boot chain, such that later components get an input encryption seed for their own morphing. Note also that the RPMBS value is not morphed its only purpose is to provide RPMB storage, which does not change from one component to the next. Under this derivation scheme, updating a component's SVN does not affect the ability of components that get loaded later in the boot chain to use current and older encryption seeds. Only identity key revisions affect subsequent components in the chain. The values of all encryption seeds and the identity seed are made available to the next component (indirectly), so that the next component can make use of them to derive encryption keys and its identity key, but cannot obtain the seed values themselves. In accordance with an embodiment, for security hygiene reasons, once the new $ES_{n+1}$ and $IS_{n+1}$ values have been derived, the current $ES_n$ and $IS_n$ values are erased from memory to prevent accidental disclosure.

Derivation of Encryption and Signing Keys

In accordance with an embodiment, each component in the boot chain is given an opportunity to securely store its own data, as well as sign statements with its own identity key. In such an embodiment, encryption keys can be derived from encryption seeds, and identity keys can be derived from identity seeds. Additionally, each component has (indirect or opaque) access to its own encryption and signing keys. Further, each component is able to recover data it has stored in the past using previous versions its keys, but not any future keys. Having access to encryption keys, up to the component's SVN, and its identity key, satisfies these requirements.

Many key derivation functions can happen at the "trustlet" level, where a trustlet is an isolated application running on top of a more privileged trusted execution environment "host". As used herein, the symbol ← designates an operation that returns a handle to a value, rather than an actual value. Here, it is assumed that a trustlet receives a handle from the trusted execution environment, which in turn maintains the actual mapping between the handles and seed/key values. Values of seeds and keys remain opaque to the trustlet (they have $U-BC_n$ designation).

In order to derive its own seeds and keys, a component can have access to a set of APIs described below.

In an embodiment, an encryption seed can be retrieved as follows:

$$Retrieve\_Encryption\_Seed(j) \leftarrow ES(BC_n, j).$$

where this call retrieves the handle for an encryption seed given by index j, where j cannot exceed the component's SVN.

In an embodiment, an identity seed can be retrieved as follows:

$$Retrieve\_Identity\_Seed(\ ) \leftarrow IS(BC_n),$$

where this call retrieves the handle for the current component's identity seed.

New encryption and identity seeds can be generated from existing encryption and identity seeds as follows:

$$Generate\_Encryption\_Seed(Handle, Entropy) \leftarrow OWF(Handle, Entropy)$$

$$Generate\_Identity\_Seed(Handle, Entropy) \leftarrow OWF(Handle, Entropy)$$

For the first of the calls above, the Handle parameter refers to a previously retrieved encryption seed. For the second of the calls above, the Handle parameter is a previously retrieved identity seed. Entropy is supplied to differentiate encryption seeds' values from each other.

In an embodiment, encryption seed handles can be used to generate symmetric and asymmetric keys, and identity seeds can be used to generate asymmetric keys only, as follows:

$$Generate\_Symmetric\_Encryption\_Key(Handle, \{Parameters\}) \leftarrow KDF\text{-}s(Handle, \{Parameters\})$$

$$Generate\_Asymmetric\_Encryption\_Key(Handle, \{Parameters\}) \leftarrow KDF\text{-}a(Handle, \{Parameters\})$$

$$Generate\_Identity\_Key(Handle, \{Parameters\}) \leftarrow KDF\text{-}a(Handle, \{Parameters\})$$

where the "Parameters" set of arguments can vary per API, and thus, can include things like algorithm choice, key size, key derivation templates, and so on.

An API that generates asymmetric keys can also return the public key value in addition to the key handle, while the private portion of keys remains opaque to the caller. The key handles thus generated can then be used by a cryptographic engine (which are outside the scope of this description) to perform encryption, decryption, signing and signature verification operations.

Implications on fTPM Design

An fTPM can be a "trustlet" (isolated high integrity application) running in a trusted execution environment (TrEE). From the boot chain perspective, TrEE is the parent component of the fTPM and stays resident after the fTPM is launched; thus it can provide services that the fTPM requires, such as opaque (a.k.a. "oracle") access to seeds and keys. The trusted execution environment also hosts ancillary services that can be utilized by the fTPM, such as the "secure storage service" (SSS).

Per the TPM Architecture, the TPM requires three "primary seeds" for its operation—Endorsement Primary Seed (EPS), Platform Primary Seed (PPS) and Storage Primary Seed (SPS), described in sections 14.3.2-14.3.4 of the TPM 2.x Architectural Specification. Each primary seed has its own properties, which should be matched by this architecture. All of these seeds should have the U-fTPM designation (the trustlet code should not directly access the seed values since a vulnerable trustlet could disclose the seeds if attacked).

All three of these seed values should be made opaque to fTPM implementation. This can be done by exposing them in a way that the fTPM can only use them indirectly through an "oracle" (e.g. one provided by TrEE or SSS).

Storage Primary Seed (SPS)

In accordance with an embodiment, the SPS can be derived as follows:

$$SPS := OWF(ES_{fTPM}, \text{``SPS''}, nonce)$$

where $ES_{fTPM}$ is the encryption seed of the fTPM trustlet binary (corresponding to its latest SVN) and "nonce"—a random value that is generated for the purpose of this derivation and deleted after the SPS is generated. Referring briefly back to FIGS. 3A and 3B, the $ES_{fTPM}$ is labeled as $ES_m$ in FIGS. 3A and 3B, and may also be referred to as a "Secret Device Seed". After generation, the nonce value should be securely (confidentiality and integrity protected) persisted in an fTPM's non-volatile storage, since without it, it will not be possible to recreate the SPS value at a later point in time.

In accordance with an embodiment, the SPS would be invalidated on issuance of the TPM2_Clear( ) command, as well as on a security update to the fTPM trustlet. The way SPS derivation is performed (based on $ES_{fTPM}$) allows the fTPM implementation to retrieve previous versions of the SPS following a security update.

Endorsement Primary Seed (EPS)

Figure 4:
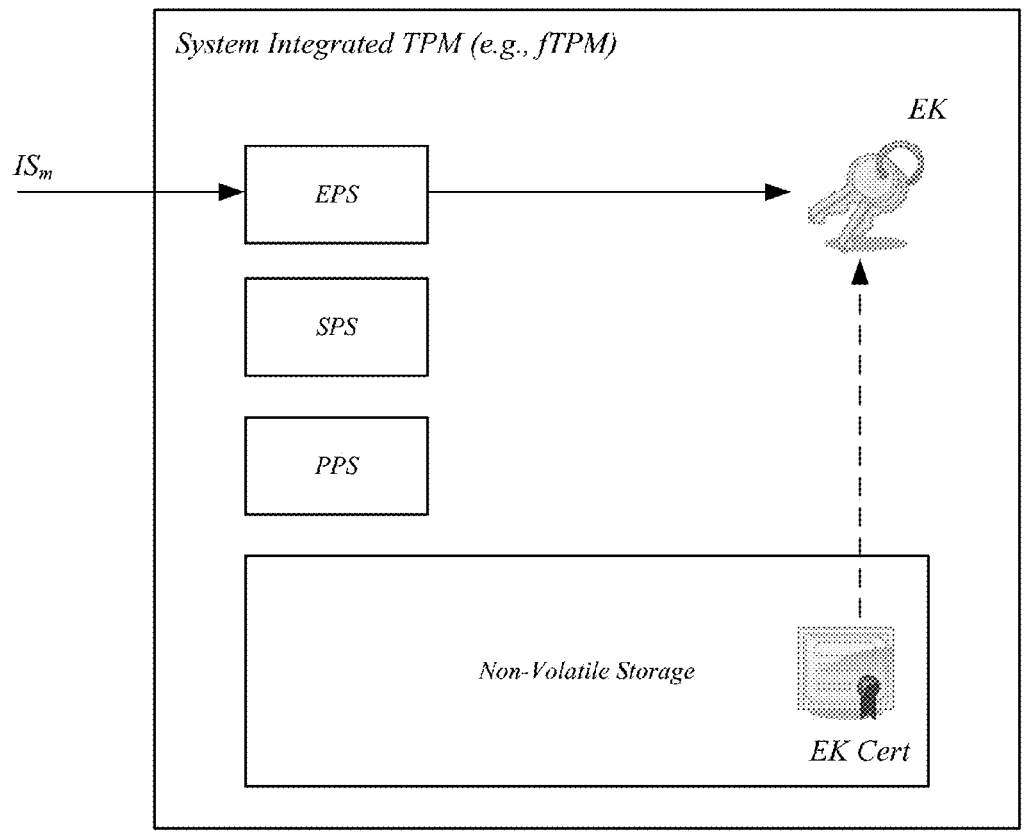
FIGS. 4 and 5 illustrate two different ways that Public Device Identity seeds, generated using seed morphing, can be used to produce TPM encryption keys, according to embodiments of the present technology.
Figure 5:
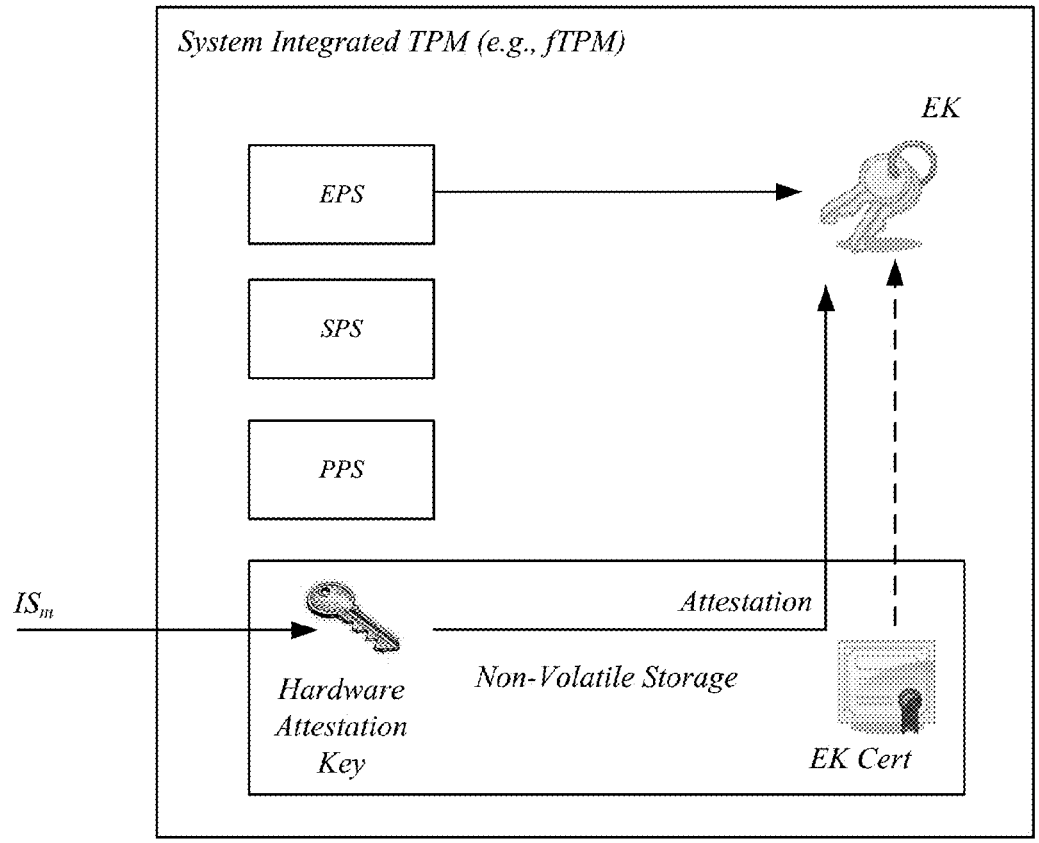

As can be appreciated from FIGS. 4 and 5, the EPS can be used to generate the TPM endorsement keys (EKs). A corresponding endorsement certificate (EK Cert) has to be certified by an external entity, which means that the device should be capable not only of EK generation, but also of engaging in a protocol exchange with an external certification service to get the corresponding EK certificate generated and signed by such a service every time the EPS changes. In accordance with an embodiment, the EPS is generated in dependence on the $IS_m$, which as can be appreciated from FIGS. 3A and 3B can be the $IS_{fTPM}$, which can also be referred Public Device Identity. For a specific example, in the embodiment of FIG. 4, the EPS can be derived as follows:

$$EP := OWF(IS_{fTPM}, \text{"EPS"}, \text{nonce})$$

where "nonce" is a random value that would continue to ensure that the EPS would change on every change command, while still being generated from the identity seed value. Such an embodiment is illustrated in FIG. 4. Further, FIG. 4 illustrates that TPM endorsement keys (EKs) can be derived and certified based on the $IS_m$.

The nonce value could be stored by a system integrated TPM (e.g., the fTPM) in its non-volatile storage, so that the EPS (and the corresponding EK) could be derived again later if needed.

In certain embodiments, a computing device capable of proving its genuineness (and the value of RIS) to a third party service can engage in a protocol with an EK certification service in order to certify a new EK. The device can prove its genuineness to a service, thus letting the service compute, independently of the device, its RIS value and thus the expected $IS_{fTPM}$ value. The device can send the nonce used in EPS generation along with proof of genuineness. Here it would be useful to also include the public portion of the EK generated on the device for the EPS value computed by the device.

The certification service can validate the proof of genuineness obtained from the device (in this process the certification service reveals the value of HW-Keys as well as its RIS). From the expected value of $IS_{fTPM}$, and the supplied nonce, the certification service can generate the EPS value that matches what has been computed on the device, and from there the certification service can computes an EK and a corresponding EK certificate, and then sign the EK certificate. Here, the desired property is that if the boot chain leading up to fTPM is not what the service expects, the $IS_{fTPM}$ value expected by the certification service would not match the EK value computed by the computing device, and thus the computing device that is not fully patched per the server's expectations would not be able to use the EK certificate for attestation. The certification service can then send the new EK certificate back to the computing device, at which time the computing device can start using the new EK certificate.

An alternative approach to changing the EPS on every change in fTPM identity would be to derive a symmetric key from the $IS_m$ (e.g., the $IS_{fTPM}$) and use that to sign attestation statements as well as certify other keys. Such an alternative approach is illustrated in FIG. 5. Referring to FIG. 5, a symmetric key, which can also be referred to as a hardware attestation key, can be exposed to an application performing attestation as a persistent handle. The EPS would then remain constant when the $IS_m$ (e.g., the $IS_{fTPM}$) changes. In such an embodiment, the attestation service should be prepared to deal with a new form of attestation statement—the one signed by the symmetric key (which the attestation service would have to derive or look up using mechanisms beyond the scope of this specification). Attestation keys should not be used in this case, except when certified by the aforementioned derived key.

Platform Primary Seed (PPS

According to the TPM 2.x Architectural Specification, the Platform Primary Seed may be injected only by the TPM manufacturer. Effectively, this can be interpreted as meaning that the PPS can be considered immutable for the lifetime of the device. According, the PPS can be derived as follows.

$$PPS := OWF(RPMB, \text{"PPS"}).$$

The choice of RE IBS for the source of the seed derivation here is based on the fact that RPMBS is both secret and immutable for the lifetime of the device, but RES could be used instead. RPMBS has the advantage over RES in that RES value is likely erased from memory for security hygiene reasons early in boot, whereas the RPMBS value stays around for the uptime of the device. In some computing devices, the RPMBS value actually changes when there are firmware upgrades. In such computing devices, it would be preferred to derive the PPS based on some other device secret which is known to be immutable, and is accessible even after the computing devices is booted.

Endorsement Key

The endorsement key (EK) is the basis on which the fTPM (or more generally, the system integrated TPM) can prove the device's identity to an attestation service. The EK can be derived at runtime from the EPS and need not be persisted. An implementation that chooses to cache the derived EK in non-volatile storage should ensure that every change to the $IS_m$ (e.g., $IS_{fTPM}$) would cause the EPS, and thus the EK, to be invalidated. This would mean that every security update in the boot chain, up to and including the fTPM trustlet, would result in the EK being invalidated. The software on the device should respond to such an event by generating a new set of EK(s) from the latest EPS, and then obtaining and certifying (using the device manufacturer's on-line certification service) a new set of endorsement certificates. A system can know when it is time to obtain a new EK—by asking the fTPM for a quote over the initial (zero) PCR values with a known (e.g. zero) nonce, and persisting the results. When EX changes as a result of an $IS_m$ (e.g., $IS_{fTPM}$) identity change, the quote value will change also.

Seed Registers and Seed Morphing Engine

In accordance with an embodiment, a computing device includes the following registers that are for use in storing seed values:

IS_C—register containing the current boot chain component's identity seed value

IS_N—register containing the next boot chain component's identity seed value

ES_C—register containing the current boot chain component's encryption seed value ES_N—register containing the next boot chain component's encryption seed value for a given (current or previous) SVN In accordance with an embodiment, at device power-up, the computing device goes through an initialization phase a follows:

ES_C register is loaded with the RE'S value read from fuses

ES_N register can be left uninitialized or set to 0

The RES value in fuses is then locked out for read until next device power-up

IS_C register value is computed:
　In some embodiments, IS_C might be a SHA-256 hash of a concatenation of RES with a well-known "Identity" hard-coded constant
　In other embodiments, an encrypted value of RIS is stored in fuses and the plaintext value of RIS is decrypted from that at runtime IS_N register can be left uninitialized or set to 0

The RPMBS seed is computed as a SHA-256 hash of a concatenation of ES_C with a well-known "RPMB" hard-coded constant; this seed is then used to compute the RPMB storage keys with which the RPMB storage controller is initialized; the RPMBS seed value itself is then erased from memory In accordance with an embodiment, Each component of the boot chain has the following atomic CPI: instructions available to it:

MORPH_ESC (ID)—morphs the ES_C register using next component's ID (specified as a 224-bit value):
　ES_C:=SHA-256(ES_C, ID, 1)
　ES_N:=0

MORPH_ISC_SVN (ID, SVN)—morphs the IS_C register using next component's ID (specified as a 224-bit value), its SVN (32-bit unsigned integer) and optional 256-bit entropy.
　IS_C:=SHA-256(SHA-256(IS_C, ID, SVN), [ENTROPY])
　Outer SHA operation only takes place if entropy is specified (non-zero)
　IS_N:=0

MORPH_ISC_IMGHASH (HASH, [ENTROPY])—morphs the IS_C register using next component's 256-bit image hash and an optional 256-bit entropy:
　IS_C:=SHA-256(SHA-256(IS_C, HASH), [ENTROPY])
　Outer SHA operation only takes place if entropy is specified (non-zero)

LOAD_ESN (ID, j)—loads the ES_N register with the next component's encryption seed using ID (specified as a $224^1$-bit value) and SVN value j (a 32-bit unsigned integer):
　ES_N:=SHA-256(ES_C, ID, j)

LOAD_ISN_SVN (ID, SVN, [ENTROPY])—loads the IS_N register using next component's ID (specified as a 224-bit value) and SVN (32-bit unsigned integer)
　IS_N:=SHA-256(SHA-256(IS_C, ID, SVN), ENTROPY)
　Outer SHA operation only takes place if entropy is specified (non-zero)

LOAD_ISN_IMGHASH(HASH, [ENTROPY])—loads the IS_N register using next component's image 256-bit image hash and optional 256-bit entropy
　ISN_N:=SHA-256(SHA-256(IS_C, HASH), ENTROPY)
　Outer SHA operation only takes place if entropy is specified (non-zero)

CREATE_ES_FROM_ESC/CREATE_ES_FROM_ESN (Entropy, Destination) creates a new ES from the current value of the ES_C or ES_N register, using given entropy (256-bit value), and places the generated 256-bit ES value into a location given by Destination
　Destination:=SHA-256(ES-C, Entropy) or
　Destination:=SHA-256(ES_N, Entropy)
　If the caller cares about the security of the generated ES value, it is responsible for securing the memory pointed to by "Destination"

CREATE_IS_FROM_ISC/CREATE_IS_FROM_ISN (Entropy, Destination)—Creates a new IS from the current value of the IS_C or IS_N register, using the given entropy (256-bit value) and places the generated 256-bit IS value into a location given by Destination
　Destination:=SHA-256(IS_C, Entropy) or
　Destination:=SHA-256(IS_N, Entropy)

In accordance with an embodiment, if a caller cares about the security of the generated ES value, it is responsible for securing the memory pointed to by "Destination".

Different platforms may differ in their ability to provide dedicated cryptographic engines capable of operating on opaque keys. Some of these keys can be derived from encryption and identity seeds in ES_C and IS_C registers, others on keys loaded from "regular" memory. Correspondingly, if a platform is capable of operations on opaque keys, it should provide hardware instructions for deriving opaque symmetric and asymmetric keys front the ES_C and IS_C registers and loading them into the crypto engine. For performance reasons, a platform may also provide facilities where generated keys can be opaquely loaded and evicted from the crypto engines by wrapping them with some sort of ephemeral platform-internal keys, rather than being derived anew each time. These mechanisms are well known and will not be covered here.

Preferably, embodiments of the present technology should be compatible with existing, extensively peer reviewed attestation mechanisms (such as TCG's Trusted Platform Module specification). A potential difficulty with a late-start firmware-based TPM implementation is that a lot can happen in the system before the firmware-based TPM is launched. In accordance with certain embodiments described herein, the identity of the fTPM application and the boot chain that precedes are captured in the EK—basically, and the platform can obtain an EK certificate after proving to some "cloud certification service" (CCS) its state and (optionally) its genuineness. Any change in the boot chain leading up to fTPM could involve the change in the fTPM application identity (expressed as the value of the endorsement key it is allowed to derive), and a corresponding process of obtaining a new EK certificate. Once the EK has been thus obtained, the rest of the attestation mechanisms can function exactly in accordance with the TCG specifications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A method for hardware rooted attestation of a computing device having a system integrated trusted platform module (TPM), wherein in components in a boot chain for the computing device are loaded and executed prior to the system integrated TPM being loaded and executed by the computing device, wherein m≥2, the method comprising:

after powering-up of the computing device, but before the system integrated TPM is loaded and executed by the computing device, for n=0 to m, morphing an $n^{th}$ encryption seed ($ES_n$) into an $n+1^{th}$ encryption seed ($ES_{n+1}$), under control of an $n^{th}$ component in the boot chain, by extending the $n^{th}$ encryption seed ($ES_n$) with a measurement of the $n+1^{th}$ component in the boot chain to thereby generate the $n+1^{th}$ encryption seed ($ES_{n+1}$);

wherein n is an integer incremented by 1; and wherein an initial encryption seed $ES_0$, which corresponds to n=0, comprises a root encryption seed (RES) that is unique to the computing device.

2. The method of claim 1, further comprising:

after powering-up of the computing device, but before the system integrated TPM is loaded and executed by the computing device, for n=0 to m, also morphing an $n^{th}$ identity seed ($IS_n$) into an $n+1^{th}$ identity seed ($IS_{n+1}$), under control of the $n^{th}$ component in the boot chain, by extending the $n^{th}$ identity seed ($IS_n$) with a measurement of the $n+1^{th}$ component in the boot chain to thereby generate the $n+1^{th}$ identity seed ($IS_{n+1}$);

wherein an initial identity seed $IS_0$, which corresponds to n=0, comprises a root identity seed (RIS) that is unique to the computing device;

wherein only one of the RES and the RIS is immutably stored in hardware of the computing device, and wherein the method further comprises generating, based on the one of the RES and the RIS that is immutably stored in hardware of the computing device, the one of the RES and the RIS that is not immutably stored in hardware of the computing device.

3. The method of claim 2, wherein:

the method establishes trust in the system integrated TPM despite the system integrated TPM not being the first component loaded and executed after powering-up of the computing device;

the encryption seeds ($ES_n$) are for use in generating encryption keys that are used to encrypt data in an isolated manner; and the identity seeds ($IS_n$) are for use in generating identity keys that are used to establish globally unique and remotely verifiable security states for code segments stored in memory of the computing device.

4. The method of claim 2, wherein:

after morphing the RES into the encryption seed $ES_1$, preventing any access to the RES until a next booting up and/or powering up of the computing device; and after morphing the RIS into the identity seed $IS_1$, preventing any access to the RIS until a next booting up and/or powering up of the computing device.

5. The method of claim 1, wherein the system integrated TPM comprises a firmware-based trusted platform module (fTPM).

6. The method of claim 5, wherein:

when n=0, the $n^{th}$ component in the boot chain comprises an initial program loader (IPL); and when n=m, the $n^{th}$ component in the boot chain comprises the fTPM.

7. The method of claim 1, further comprising:

generating an endorsement primary seed (EPS) in dependence on the $m^{th}$ encryption seed ($ES_{n=m}$); and generating a trusted platform module (TPM) endorsement key (EK) in dependence on the EPS.

8. The method of claim 7, wherein the EPS, and the EK produced in dependence on the EPS, will both change when any of the components in the boot chain, up to and including the system integrated TPM, is changed.

9. The method of claim 1, further comprising:

generating a hardware attestation key in dependence on the $m^{th}$ encryption seed ($ES_{n=m}$); and generating a TPM endorsement key (EK) in dependence on an endorsement primary seed (EPS).

10. The method of claim 9, wherein the EPS remains unchanged when a non-security related change is made to a component in the boot chain, and thus, the EK produced in dependence on the EPS remains unchanged when a non-security related change is made to any of the components in the boot chain, up to and including the system integrated TPM.

11. A computing device, comprising:

a central processing unit (CPU);

a system integrated trusted platform module (TPM);

a plurality of boot chain components that are loaded and executed prior to the system integrated TPM being loaded and executed by the CPU;

wherein each of that components in the boot chain, that are loaded and executed prior to the system integrated TPM being loaded and executed by the CPU, includes instructions that when executed by the CPU cause an $n^{th}$ encryption seed ($ES_n$) to be morphed into an $n+1^{th}$ encryption seed ($ES_{n+1}$), under control of the $n^{th}$ component in the boot chain, by extending the $n^{th}$ encryption seed ($ES_n$) with a measurement of the $n+1^{th}$ component in the boot chain to thereby generate the $n+1^{th}$ encryption seed ($ES_{n+1}$).

12. The computing device of claim 11, wherein:

each of the components in the boot chain, that are loaded and executed prior to the system integrated TPM being loaded and executed by the CPU, also includes instructions that when executed by the CPU cause an $n^{th}$ identity seed ($IS_n$) to be morphed into an $n+1^{th}$ identity seed ($IS_{n+1}$), under control of the $n^{th}$ component in the boot chain, by extending the $n^{th}$ identity seed ($IS_n$) with a measurement of the $n+1^{th}$ component in the boot chain to thereby generate the $n+1^{th}$ identity seed ($IS_{n+1}$);

n=0 upon power-up of the computing device;

n is incremented by 1 when a next component in the boot chain is loaded, until n=m;

when n=0 the $n^{th}$ component in the boot chain comprises an initial program loader (IPL);

when n=m, the $n^{th}$ component in the boot chain comprises the system integrated TPM;

an initial encryption seed $ES_0$, which corresponds to n=0, comprises a root encryption seed (RES); and an initial identity seed $IS_0$, which corresponds to n=0, comprises a root identity seed (RIS).

13. The computing device of claim 12, further comprising:

an immutable hardware component that maintains at least one of the RES and the RIS.

14. The computing device of claim 11, wherein:

the system integrated TPM comprises a firmware-based trusted platform module (fTPM);

when n=0, the $n^{th}$ component in the boot chain comprises an initial program loader (IPL); and when n=m, the $n^{th}$ component in the boot chain comprises the fTPM.

15. The computing device of claim 11, wherein the system integrated TPM includes:

a first module that generates an endorsement primary seed (EPS) in dependence on the $m^{th}$ identity seed ($IS_{n=m}$); and a second module that generates a trusted platform module (TPM) endorsement key (EK) in dependence on the EPS.

16. The computing device of claim 11, wherein the system integrated TPM includes:

a first module that generates a hardware attestation key in dependence on the $m^{th}$ identity seed ($IS_{n=m}$); and a second module that generates a trusted platform module (TPM) endorsement key (EK) in dependence on an endorsement primary seed (EPS).

17. One or more processor readable storage devices having instructions encoded thereon which when executed by a computing device cause the computing device to perform a method comprising:

morphing an $n^{th}$ encryption seed ($ES_n$) into an $n+1^{th}$ encryption seed ($ES_{n+1}$), under control of an $n^{th}$ component in a boot chain, by extending the $n^{th}$ encryption seed ($ES_n$) with a measurement of the $n+1^{th}$ component in the boot chain to thereby generate the $n+1^{th}$ encryption seed ($ES_{n+1}$);

wherein the morphing is initiated upon powering-up of the computing device, and continues until a system integrated trusted platform module (TPM) is loaded and executed by the computing device; and wherein the boot chain includes at least two components that are loaded and executed by the computing device prior to the system integrated TPM being loaded and executed by the computing device.

18. The one or more processor readable storage devices of claim 17, wherein the method further comprises:

generating an endorsement primary seed (EPS) in dependence on the $m^{th}$ encryption seed ($ES_{n=m}$); and generating a trusted platform module (TPM) endorsement key (EK) in dependence on the EPS;

wherein the EPS, and the EK produced in dependence on the EPS, will both change when any of the components in the boot chain, up to and including the system integrated TPM, is changed.

19. The one or more processor readable storage devices of claim 17, wherein the method further comprises:

generating a hardware attestation key in dependence on the $m^{th}$ encryption seed ($ES_{n=m}$); and generating a trusted platform module (TPM) endorsement key (EK) in dependence on an endorsement primary seed (EPS);

wherein the EPS remains unchanged when a non-security related change is made to a component in the boot chain, and thus, the EK produced in dependence on the EPS remains unchanged when a non-security related change is made to any of the components in the boot chain, up to and including the system integrated TPM.

20. The one or more processor readable storage devices of claim 17, wherein the method further comprises:

morphing an $n^{th}$ identity seed ($IS_n$) into an $n+1^{th}$ identity seed ($IS_{n+1}$), under control of the $n^{th}$ component in the boot chain, by extending the $n^{th}$ identity seed ($IS_n$) with a measurement of the $n+1^{th}$ component in the boot chain to thereby generate the $n+1^{th}$ identity seed ($IS_{n+1}$);

after morphing the RES into the encryption seed $ES_1$, preventing any access to the RES until a next booting up and/or powering up of the computing device; and after morphing the RIS into the identity seed $IS_1$, preventing any access to the RIS until a next booting up and/or powering up of the computing device.

* * * * *